(No Model.)
J. FISH.
BICYCLE CAR TRUCK.
No. 459,888. Patented Sept. 22, 1891.
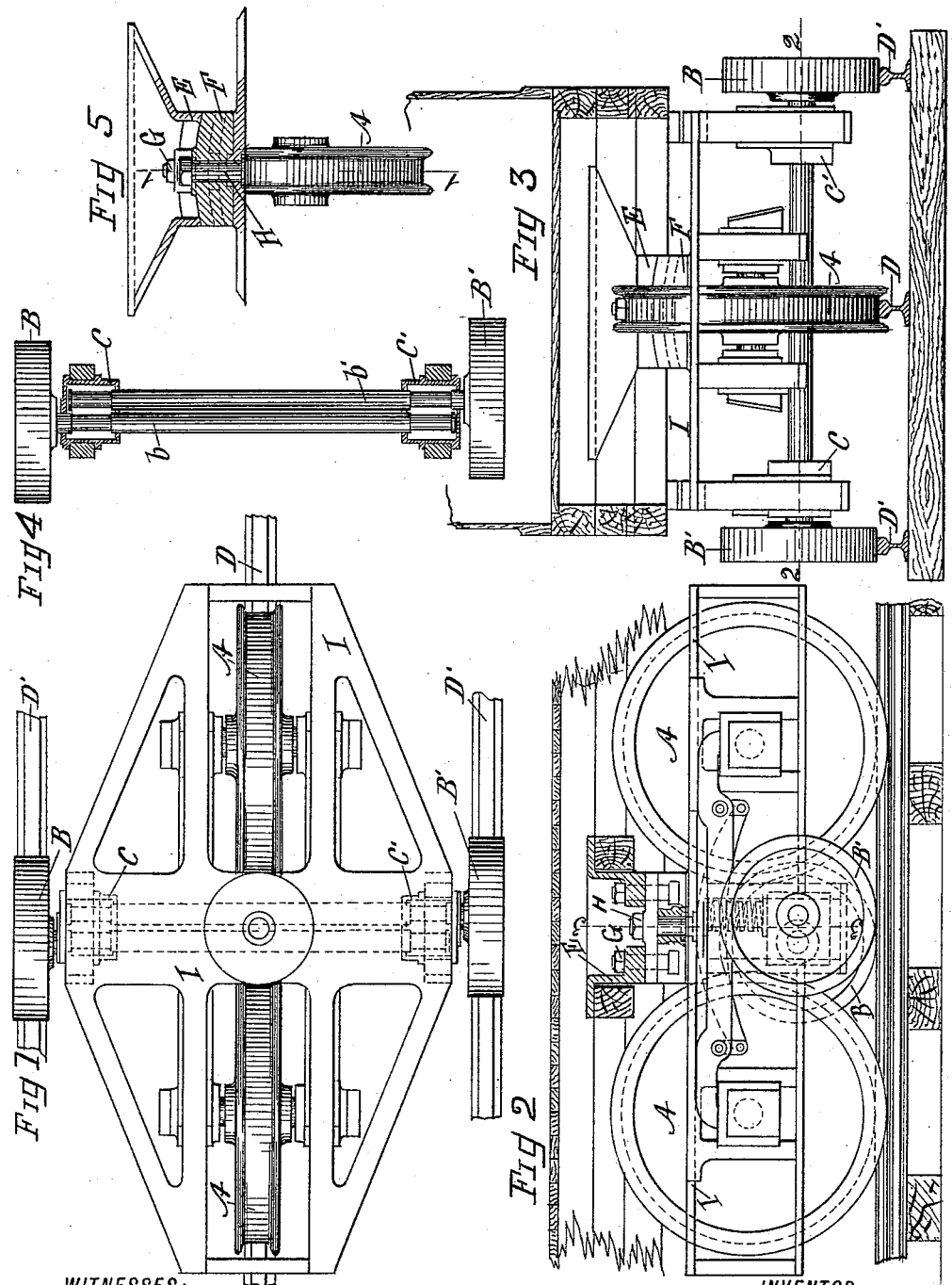
WITNESSES
Edw. M. Hussey.
Albert K. Owen.
INVENTOR
John Fish.

UNITED STATES PATENT OFFICE.

JOHN FISH, OF SUMMIT, NEW JERSEY.

BICYCLE CAR-TRUCK.

SPECIFICATION forming part of Letters Patent No. 459,888, dated September 22, 1891.

Application filed January 20, 1891. Serial No. 378,389. (No model.)

*To all whom it may concern:*

Be it known that I, JOHN FISH, a citizen of the United States, and a resident of Summit, in the county of Union and State of New Jersey, have invented certain new and useful Improvements in Bicycle Car or Motor Trucks, of which the following is a specification.

My invention relates to improvements in bicycle car or motor trucks having two double-flanged wheels each in line with the other in the center line of the truck, running upon a center rail placed between two outer rails. Upon the outer rails run two flangeless bearing-wheels, the axles of which are placed about central between the double-flanged center-rail wheels. The center rail and the two outer rails are supposed to be on about the same plane. The frame of the truck carrying these wheels is attached by a center pin or bolt to a bolster, which, in relation to the load to be carried, is stationary, and around which bolster the truck swivels on a horizontal plane. On top of this bolster a curved bearing-surface is formed, with a radius having its center taken on top of the center rail, so that the transverse oscillations of the car or motor on passing around a curve will reduce the side-thrust on the truck-wheels. The bolster is attached to the saddle, which is connected to the car or truck frame by means of two safety-bolts, the heads of which slide in curved grooves, attaching the bolster and saddle securely; but allows for a transverse motion.

The invention also consists in the combination of two axles for the bearing-wheels, so arranged that each wheel is mounted upon its own axle, which runs independent of the other wheel and axle, each of the two axles having a journal running in one bearing-box on one side of the frame and the other journal of the same axle running in the box on the other side of the frame. Thus each bearing-box has two bearings, one bearing carrying the neck-journal of the axle of one wheel and the other bearing carrying the outer or free end journal of the axle of the other wheel. The axles are set a sufficient distance apart to just clear each other. By means of this arrangement the truck having the center swiveling-pin directly over the center of the two bearing-wheel axles and they being placed central longitudinally between the two center-rail wheels, it follows that in running around a curve the bearing-wheels run normal with the curve, and, being free and independent in running, the difficulty of slip and drag when both wheels are fixed on one axle is entirely done away with. I attain these results by the mechanism illustrated in the accompanying drawings, in which—

Figure 1 represents a plan view of truck. Fig. 2 represents a side elevation of truck, showing section of saddle through 1 1, Fig. 5. Fig. 3 represents end elevation of truck. Fig. 4 represents section through 2 2, Fig. 3. Fig. 5 represents section through 3 3, Fig. 2.

Similar letters refer to similar parts throughout the several views.

In Figs. 1 and 2, A A represent the double-flanged center-rail wheels; B B', bearing-wheels for outside rails; *b b*, axles for bearing-wheels; C C', boxes for bearing-wheel axles; E, saddle; F, bolster; G, safety-bolts for saddle; H, center-pin bolt; I, truck-frame; D, center rail; D' D', outside rails.

Having thus described my invention, what I claim as new, and desire to secure by Letters Patent, is—

1. In a bicycle car or motor truck having double-flanged center-rail wheels and flangeless bearing-wheels running upon outside rails, the combination of the double-flanged center-rail wheels, with the flangeless outside-rail bearing-wheels, each bearing-wheel having an axle independent of the other and running in bearing-boxes, each bearing-box having two bearings carrying a journal of each axle, substantially as arranged and described, and for the purpose as herein set forth.

2. The combination, in a truck, of two bearing-wheels having separate and independent axles, with two bearing-boxes, each box having two bearings carrying a journal of each axle, substantially as arranged and specified, and as herein set forth.

3. In a bicycle car or motor truck having double-flanged center-rail wheels, and flangeless bearing-wheels running upon outer rails, the combination of the center-rail wheels and outer bearing-wheels having separate and independent axles, with a bolster, center pin, and safety-bolt, substantially as specified and described, and for the purpose as herein set forth.

Signed at the city of New York, in the county of New York and State of New York, this 13th day of January, A. D. 1891.

JOHN FISH.

Witnesses:
   EDWD. M. HUSSEY,
   ALBERT K. OWEN.